United States Patent
Patel et al.

(10) Patent No.: US 9,866,442 B2
(45) Date of Patent: Jan. 9, 2018

(54) MULTI-LAYER VIRTUAL INFRASTRUCTURE EMBEDDING IN SOFTWARE-DEFINED FLEXIBLE-GRID TRANSPORT NETWORKS

(71) Applicant: NEC Laboratories America, Inc., Princeton, NJ (US)

(72) Inventors: Ankitkumar Patel, Monmouth Junction, NJ (US); Philip Nan Ji, Cranbury, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 278 days.

(21) Appl. No.: 14/699,228

(22) Filed: Apr. 29, 2015

(65) Prior Publication Data

US 2015/0319047 A1 Nov. 5, 2015

Related U.S. Application Data

(60) Provisional application No. 61/987,856, filed on May 2, 2014.

(51) Int. Cl.
*H04J 14/02* (2006.01)
*H04L 12/24* (2006.01)

(52) U.S. Cl.
CPC .......... *H04L 41/12* (2013.01); *H04J 14/0257* (2013.01); *H04J 14/0271* (2013.01); *H04L 41/22* (2013.01)

(58) Field of Classification Search
CPC .... H04J 14/02; H04J 14/0227; H04J 14/0212; H04J 14/0258; H04J 14/0267; H04J 14/0254; H04Q 11/0005; H04Q 11/0066; H04Q 11/0062; H04L 41/12; H04L 45/62; H04L 45/06

(Continued)

(56) References Cited

U.S. PATENT DOCUMENTS

| 2014/0099118 A1* | 4/2014 | Zhang | H04J 14/0257 398/79 |
| 2014/0099119 A1* | 4/2014 | Wei | H04J 14/0257 398/79 |
| 2015/0104172 A1* | 4/2015 | Wang | H04J 14/0254 398/58 |

OTHER PUBLICATIONS

Ji, P. et al., "Software Defined Optical Network," Nov. 2012. pp. 1-4.

(Continued)

*Primary Examiner* — Hanh Phan
(74) *Attorney, Agent, or Firm* — Joseph Kolodka

(57) ABSTRACT

Methods and systems for embedding VI demands in a software-defined network include mapping virtual nodes over physical nodes in a network topology. An auxiliary graph including virtual links between physical nodes that have a residual capacity sufficient to meet a virtual infrastructure demand is constructed. Virtual links over physical links are mapped to maximize use of existing optical channels and to minimize switching of a virtual link between a wavelength division multiplexing layer and an IP layer. New optical channels with a maximum spectral efficiency are established. A set of potential solutions for embedding a set of virtual infrastructure demands is determined. A solution is selected from the set of potential solutions that maximizes a weighted average of spectrum needed to support the set of virtual infrastructure demands and a cost of provisioning the virtual infrastructure demands.

10 Claims, 3 Drawing Sheets

(58) Field of Classification Search
USPC .... 398/79, 58, 83, 45, 48, 49, 33, 25, 38, 2,
398/3, 4, 5, 10, 13, 17, 26, 27; 370/225,
370/228, 226, 238, 236, 255, 254
See application file for complete search history.

(56) References Cited

OTHER PUBLICATIONS

McKeown, N. et al., "OpenFlow: Enabling Innovation in Campus Networks," Mar. 2008. pp. 1-6.

Patel, A. et al., "QoS-Aware Optical Burst Switching in OpenFlow Based Software-Defined Optical Networks," ONDM, Apr. 2013, pp. 275-280.

* cited by examiner

MULTI-LAYER VIRTUAL INFRASTRUCTURE EMBEDDING IN SOFTWARE-DEFINED FLEXIBLE-GRID TRANSPORT NETWORKS

RELATED APPLICATION INFORMATION

This application claims priority to provisional application No. 61/987,856, filed May 2, 2014, the contents thereof being incorporated herein by reference.

BACKGROUND OF THE INVENTION

Software-defined network (SDN) architecture enables network programmability to support multi-vendor, multi-technology, multi-layer communications and offers network infrastructure as a service. Efforts to integrate optical transport within IP/Ethernet based SDN architectures are ongoing with the goal of leveraging optical transmission benefits, such as low interference, long reach, and high capacity transmission with lower power consumption. Such a network is known as a transport SDN.

Transport SDNs are implemented by enabling flexibility and programmability in wavelength division multiplexing (WDM) transmission and switching network elements, such as transponders and reconfigurable optical add-drop multiplexers (ROADMs), management of optical channels such as with flexible-grid channel mapping, and extracting control plane intelligence from the physical hardware to a centralized controller.

Network virtualization is one technology being explored, as since it supports applications and services by sharing network resources within the existing deployed infrastructure instead of building new networks from scratch. In software-defined flexible-grid transport networks, an open control plane challenge is how to map Virtual network Infrastructure (VI) demands over multi-layers of physical substrates. A VI demand is a set of Virtual Nodes (VNs) interconnected by a set of Virtual Links (VLs). The problem is how to map VNs over Physical Nodes (PNs), how to map VLs over transport connections, how to route transport connections over Physical Links (PLs), and how to assign spectral resources to the transport connections.

BRIEF SUMMARY OF THE INVENTION

A method for embedding VI demands in a software-defined network includes mapping virtual nodes over physical nodes in a network topology. An auxiliary graph including virtual links between physical nodes that have a residual capacity sufficient to meet a virtual infrastructure demand is constructed. Virtual links over physical links are mapped to maximize use of existing optical channels and to minimize switching of a virtual link between a wavelength division multiplexing layer and an IP layer. New optical channels with a maximum spectral efficiency are established. A set of potential solutions for embedding a set of virtual infrastructure demands is determined. A solution is selected from the set of potential solutions that maximizes a weighted average of spectrum needed to support the set of virtual infrastructure demands and a cost of provisioning the virtual infrastructure demands.

A system for embedding VI demands in a software-defined network includes a graph module configured to construct an auxiliary graph that includes virtual links between physical nodes that have a residual capacity sufficient to meet a virtual infrastructure demands. A mapping module includes a processor that is configured to map virtual nodes over physical nodes in a network topology. The processor maps virtual links over physical links to maximize use of existing optical channels and to minimize switching of a virtual link between a wavelength division multiplexing layer and an IP layer and establishes new optical channels with a maximum spectral efficiency. The processor determines a set of potential solutions for embedding a set of virtual infrastructure demands and selects a solution from the set of potential solutions that maximizes a weighted average of spectrum needed to support the set of virtual infrastructure demands and a cost of provisioning the virtual infrastructure demands.

DETAILED DESCRIPTION

Embodiments of the present invention perform multi-layer virtual infrastructure (VI) embedding over software-defined flexible grid transport networks. This is accomplished while minimizing the spectrum needed to embed VI demands while maximizing the revenue of providing virtualization services over a physical infrastructure. The present embodiments employ auxiliary graphs that efficiently provision VI demands in the minimum amount of spectrum while allowing a certain amount of cost for the mapping of a virtual link (VL). The present embodiments iterate over different cost thresholds to find a set of potential solutions. Then a solution is selected that minimizes a weighted average of needed spectrum and cost of mapping the VI demands.

Figure 1:
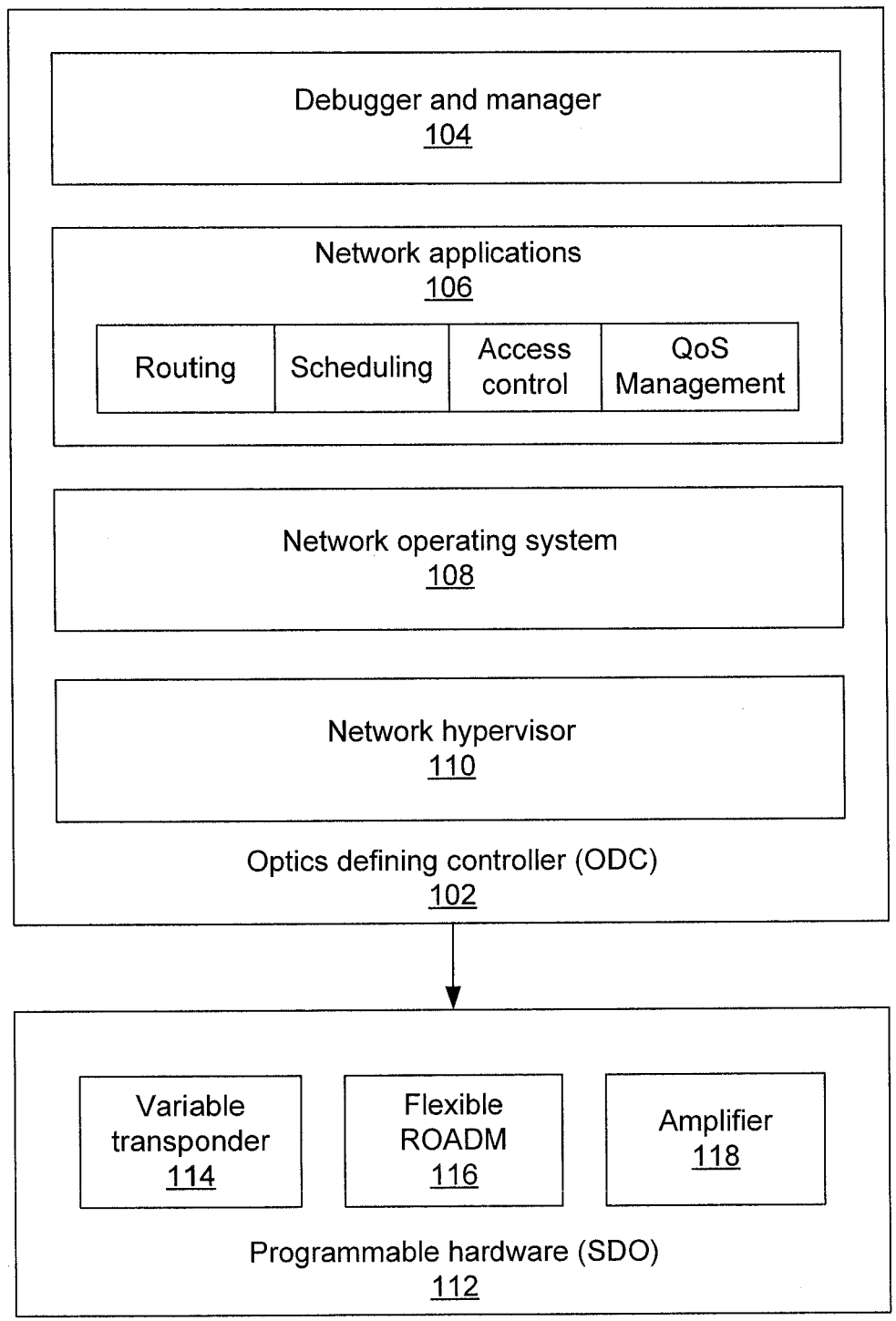
FIG. 1 is a block diagram of an optical transport software defined network architecture in accordance with the present principles.

Referring now to FIG. 1, the architecture of an optical transport software defined network (SDN) is shown. The control plane, implemented by an optics defining controller (ODC) 102, is abstracted from physical hardware of the networking elements, shown as programmable hardware 112. The centralized controller may control network elements using a protocol such as OpenFlow. Control plane decisions are represented in the form of rules, actions, and policies, and network elements apply these decisions based on match-action operations on connections. Transport SDN thereby partitions a network into software defined optics (SDO) at the programmable hardware 112 and the ODC 102.

SDO uses variable-rate transponders 114, flexible-grid channel mapping, and colorless, directionless, contentionless, gridless (CDCG) reconfigurable optical add-drop multiplexers (ROADMs) 116. The variable-rate transponders 114 can be programmed for various modulation formats and forward error correction coding. Thus, the transponders 114 offer variable transmission capacity for heterogeneous reach requirements. Flexible-grid channel mapping allows an assignment of flexible amounts of spectrum to channels to achieve higher spectral efficiency by applying spectrum-efficient modulation formats and eliminating guard bands. CDCG-ROADMs 116 can be programmed to switch connections operating on any wavelength with any spectral requirement over any outgoing direction. Furthermore, connections can be added and dropped at a node without contentions. This hardware and its features establishes the foundations of transport SDN optimization and customization.

The ODC 102 manages the network and performs network optimization and customization to make the most of the flexibility of the SDO 112. The functions of the ODC 102 are further defined by network hypervisor 110, an operating system 108, network applications 106, and debugger and management planes 104. These planes are isolated by open interfaces to allow simultaneous and rapid changes at each layer independently. Various control plane functions may include, for example, cloud resource mapping, routing and resource allocation, protection and restoration, defragmentation, and energy optimization and are installed as applications and databases 106 in the ODC 102. The network hypervisor 110 provides virtualization by providing isolation and sharing functions to a data plane as well as an abstract view of network and computing resources, while hiding physical implementation details to a controller to optimize and simplify the network operations. The operating system 108 offers a programmable platform for the execution of applications and hypervisors. Debugger and management plane 104 provides access control and quality of service (QoS) management, while monitoring network performance, and performs fault isolation, localization, and recovery.

Transport networks provide underlying infrastructures for software-defined IP backbone networks. Thus, multiple IP connections can be supported over transport networks by aggregating/switching/segregating them over high speed optical channels. Network resources can be optimized if connections are jointly provisioned over such multiple layers rather than independently over each layer.

A physical network topology may be expressed as a graph G(N, L), where N represents a set of physical nodes (PNs) and L represents a set of physical links (PLs) interconnecting the nodes. A node may be an instance of programmable hardware 112 including a CDCG-ROADM 116 and a variable-rate transponder 114. The CDCG-ROADM 116 offers switching of flex-grid optical connections while variable rate transponders offer a set of modulation formats M, where the spectral efficiency $Z_m$ bits/second/Hz and the transmission reach of $D_m$ km of each modulation format m is also given. A set of VI demands is used, each defined as G'(V,E,$C_j$,L), where V is a set of virtual nodes (VNs), E is a set of virtual links (VLs) connecting the virtual nodes, $C_j$ is a set of PNs on which a VN j can be mapped, and L is a set of requested line rates $l_{ij}$ between virtual nodes i and j.

The problem of mapping VI demands over flexible grid transport networks needs to address the sub-problems of mapping VNs over PNs, mapping VLs over transport connections, how to route transport connections over PLs, and how to assign spectral resources to the transport connections. For this discussion, it can be assumed that a network does not support wavelength, spectrum, or modulation format conversion.

Virtual network embedding according to the present embodiments ensures the isolation of resources assigned to different virtual networks while maintaining resource capacity constraints. While provisioning transport channels over WDM networks, the present embodiments also ensure wavelength continuity, spectral continuity, and spectral conflict constraints. The wavelength continuity constraint is defined as an allocation of spectrum at the same operating wavelength on all links along the route of an optical channel. The spectral continuity constraint is defined as an allocation of the same amount of spectrum on all links along the route of an optical channel. The spectral conflict constraint is defined as an allocation of non-overlapping spectrum to all channels routed through the same fiber. Furthermore, the selection of a modulation format for a virtual link needs to support at least the distance of the physical route on which the virtual link is mapped. This is referred to as the reachability constraint.

Figure 2:
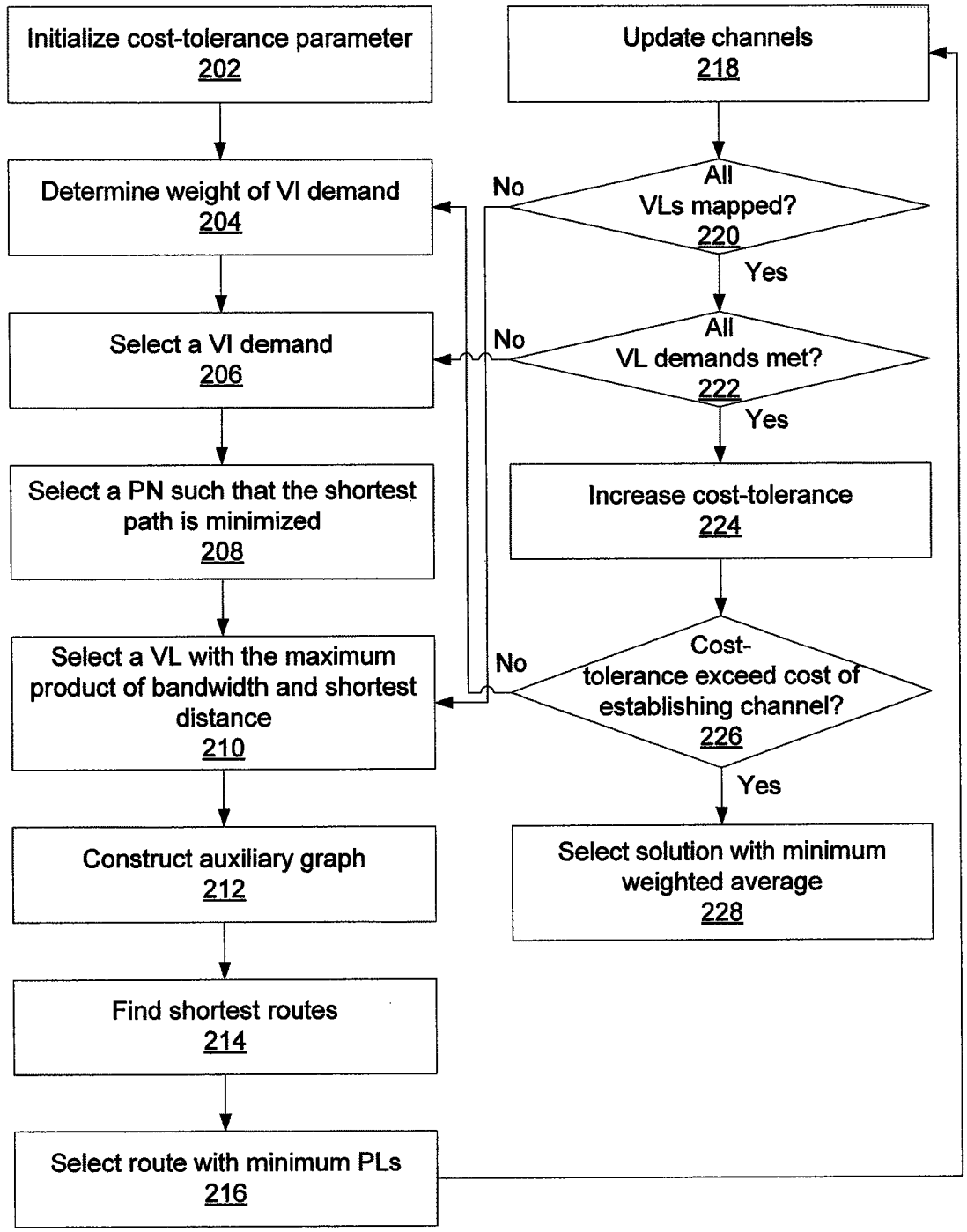
FIG. 2 is a block/flow diagram of a method for provisioning virtual infrastructure demands in accordance with the present principles.

Referring now to FIG. 2, a block/flow diagram of provisioning VI demands is shown. Block 202 begins by selecting a cost-tolerance parameter, X, that is defined as the maximum allowable cost to embed a VL. The cost-tolerance parameter X is initialized as twice the cost of a low-cost transponder. Block 204 then arranges a given set of VI demands based on a weight function that is the summation of the product of requested data rate on a VL and the average shortest distance between a pair of potential PNs on which VNs of the VL can be mapped. Block 204 arranges the VI demands in, e.g., descending order of weight. Block 206 selects a demand from the top of the sorted list produced by block 204 (i.e., the highest weighted demand). Block 208 iteratively selects a PN among a given set of PNs for each VN, such that the shortest path distance between PNs on which VNs of a VL is mapped is minimized. Once all VNs are mapped, block 210 selects a VL with a maximum product of the requested bandwidth and shortest path distance between the PNs on which VNs of the VL are already mapped.

Block 212 constructs an auxiliary graph. The graph includes additional auxiliary links in the given physical topology, where an auxiliary link between a pair of PNs can be established if an optical channel exists between the PNs with at least a requested amount of residual capacity. The weight of a PL in the auxiliary graph is always one, and the weight of an auxiliary link is the number of fiber links over which the corresponding optical channel is routed. Once the auxiliary graph is established, block 214 finds the K shortest routes between the PNs on which VNs of the VL are mapped. Among the K routes found, block 216 selects a route with a minimum number of PLs and, in case of conflicts, selects a route among conflicting routes with a minimum number of auxiliary links. Notably, the mapping of virtual links over physical links is performed to maximize use of existing optical channels and to minimize switching of a virtual link between a wavelength division multiplexing layer and an internet protocol (IP) layer.

For an auxiliary link in the selected route, block 218 updates the residual capacity of the existing optical channel that is represented as an auxiliary link. On the other hand, for a set of connected PLs forming a physical segment, block 218 establishes a set of new optical channels using a spectrum-efficient modulation format such that the cost of provisioning the new optical channels does not exceed the cost tolerance X. Block 218 updates the residual capacity of these newly established optical channels. The new optical channels are assigned spectrum at the lowest available wavelengths. Block 220 then determines whether all VLs are mapped. If not, processing returns to block 210 to select the next VL. If all VLs have been mapped, block 222 determines whether all VI demands have been met. If not, processing returns to block 206 to select the next VI demand.

Block 224 increases the cost-tolerance X by twice the cost of a low-cost transponder. Block 226 then determines whether the new cost-tolerance parameter exceeds the cost of establishing single-hop optical channels with the highest cost transponders between the farthest PNs in the network.

If not, processing returns to block 204 and the VI demands are reassessed to find a new solution with the new cost-tolerance parameter. Once block 226 finds the cost-tolerance parameter exceeds the threshold cost, block 228 selects one of the potential solutions that were found having a minimum weighted average of the spectrum needed and the cost of provisioning VI demands in the network.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
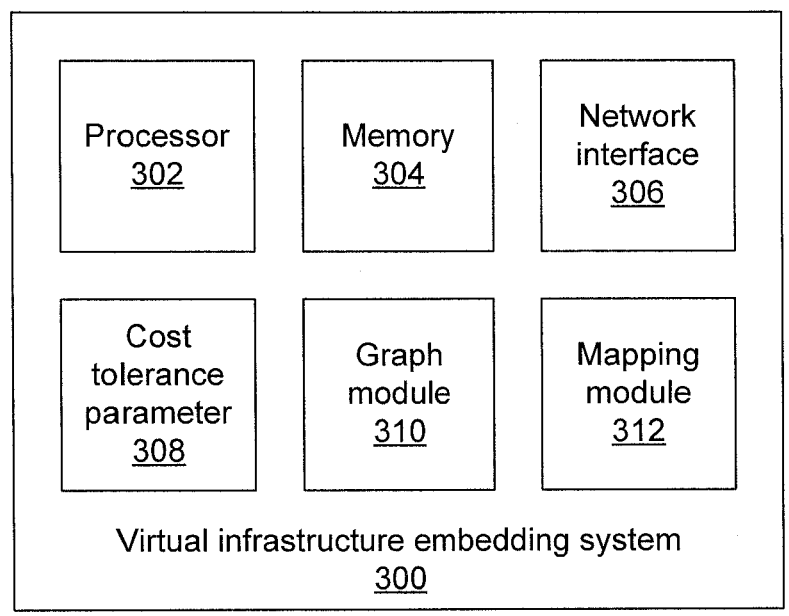
FIG. 3 is a block diagram of a system for provisioning virtual infrastructure demands in accordance with the present principles.

Referring now to FIG. 3, a block diagram of a virtual infrastructure embedding system 300 is shown. The VI embedding system 300 is specifically contemplated as being a component of the ODC 102, but may be implemented independently. A hardware processor 302 interfaces with memory 304 to implement one or more functions, either through software running on the processor 302 or implemented as application-specific logic. A network interface 306 communicates with the programmable hardware 112 to implement decisions regarding the embedding of virtual infrastructure across a network.

A cost-tolerance parameter 308 is stored in memory 304 and is used by a graph module 310 to form an auxiliary graph across PNs using auxiliary links. Mapping module 312 then creates a solution to a set of VI demands and VLs to embed a virtual infrastructure. The network interface 306 is used to communicate the solution across the network.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for embedding virtual infrastructure (VI) demands in a software-defined network, comprising:
   mapping virtual nodes over physical nodes in a network topology;
   constructing an auxiliary graph including virtual links between physical nodes that have a residual capacity sufficient to meet a virtual infrastructure demand;
   mapping virtual links over physical links to maximize use of existing optical channels and to minimize switching of a virtual link between a wavelength division multiplexing layer and an IP layer;
   establishing new optical channels with a maximum spectral efficiency;
   determining a set of potential solutions for embedding a set of virtual infrastructure demands; and
   selecting a solution from the set of potential solutions that minimizes a weighted average of spectrum needed to support the set of virtual infrastructure demands and a cost of provisioning the virtual infrastructure demands.

2. The method of claim 1, wherein mapping virtual nodes over physical nodes comprises mapping the virtual nodes such that spectrum needed for mapping the virtual nodes is minimized.

3. The method of claim 1, wherein each virtual link in the auxiliary graph maximizes a utilization of existing optical channels.

4. The method of claim 1, wherein mapping virtual links over physical links comprises minimizing an amount of occupied spectrum.

5. The method of claim 1, wherein a cost of establishing new optical channels does not exceed a cost-tolerance parameter.

6. A system for embedding virtual infrastructure (VI) demands in a software-defined network, comprising:
   a graph module configured to construct an auxiliary graph that includes virtual links between physical nodes that have a residual capacity sufficient to meet a virtual infrastructure demands;
   and a mapping module comprising a processor configured to map virtual nodes over physical nodes in a network topology, to map virtual links over physical links to maximize use of existing optical channels and to minimize switching of a virtual link between a wavelength division multiplexing layer and an IP layer, to establish new optical channels with a maximum spectral efficiency, to determine a set of potential solutions for embedding a set of virtual infrastructure demands, and to select a solution from the set of potential solutions that minimizes a weighted average of spectrum needed to support the set of virtual infrastructure demands and a cost of provisioning the virtual infrastructure demands.

7. The system of claim 6, wherein the mapping module is further configured to map the virtual nodes such that spectrum needed for mapping the virtual nodes is minimized.

8. The system of claim 6, wherein each virtual link in the auxiliary graph maximizes a utilization of existing optical channels.

9. The system of claim 6, wherein the mapping module is further configured to map virtual links over physical links to minimize an amount of occupied spectrum.

10. The system of claim 6, wherein a cost of establishing new optical channels does not exceed a cost-tolerance parameter.

* * * * *